(12) United States Patent
Yoshida et al.

(10) Patent No.: US 9,822,842 B2
(45) Date of Patent: Nov. 21, 2017

(54) FRICTION DRIVE BELT AND MANUFACTURING METHOD THEREFOR

(71) Applicant: BANDO CHEMICAL INDUSTRIES, LTD., Hyogo (JP)

(72) Inventors: Keisuke Yoshida, Hyogo (JP); Sungjin Kim, Hyogo (JP)

(73) Assignee: BANDO CHEMICAL INDUSTRIES, LTD., Hyogo (JP)

( * ) Notice: Subject to any disclaimer, the term of this patent is extended or adjusted under 35 U.S.C. 154(b) by 472 days.

(21) Appl. No.: 14/350,705

(22) PCT Filed: Sep. 27, 2012

(86) PCT No.: PCT/JP2012/006194
§ 371 (c)(1),
(2) Date: Apr. 9, 2014

(87) PCT Pub. No.: WO2013/061512
PCT Pub. Date: May 2, 2013

(65) Prior Publication Data
US 2014/0296010 A1    Oct. 2, 2014

(30) Foreign Application Priority Data

Oct. 28, 2011    (JP) .................................. 2011-236917

(51) Int. Cl.
*F16G 5/08*    (2006.01)
*B29D 29/00*    (2006.01)
(Continued)

(52) U.S. Cl.
CPC ............... *F16G 5/08* (2013.01); *B29D 29/00* (2013.01); *B29D 29/103* (2013.01); *F16G 1/08* (2013.01); *F16G 5/20* (2013.01)

(58) Field of Classification Search
CPC ......... B29D 29/00; B29D 29/103; F16G 1/08; F16G 5/08; F16G 5/20
See application file for complete search history.

(56) References Cited

U.S. PATENT DOCUMENTS

| | | | |
|---|---|---|---|
| 5,120,281 A | 6/1992 | Mishima et al. | |
| 7,056,249 B1 * | 6/2006 | Osako | F16G 1/06 474/260 |

(Continued)

FOREIGN PATENT DOCUMENTS

| | | |
|---|---|---|
| JP | 07-31006 U | 7/1995 |
| JP | 2003-012818 | 1/2003 |

(Continued)

OTHER PUBLICATIONS

International Search Report for corresponding International Application No. PCT/JP2012/006194 dated Dec. 11, 2012.

(Continued)

*Primary Examiner* — Jeremy R Pierce
(74) *Attorney, Agent, or Firm* — Renner Otto Boisselle & Sklar

(57) ABSTRACT

In order to allow a friction drive belt to have an effect of reducing slip noise produced between the belt and pulleys for a long period even when the belt gets wet with water or suffers from wearing out, a V-ribbed belt B as the friction drive belt includes a belt body 10 made of a rubber composition and configured to be wrapped around the pulleys to transmit power. The surfaces of V-shaped ribs 15 serving as a pulley contact-side surface of the belt body 10 are covered with a fabric layer 16 which is integrated with the surfaces of V-shaped ribs 15, and the fabric layer 16 retains powder 17 embedded between fibers of the fabric layer 16 and integrally stuck.

15 Claims, 11 Drawing Sheets

(51) Int. Cl.
  *F16G 5/20*  (2006.01)
  *B29D 29/10* (2006.01)
  *F16G 1/08*  (2006.01)

(56) References Cited

U.S. PATENT DOCUMENTS

| | | |
|---|---|---|
| 2003/0004025 A1 | 1/2003 | Okuno et al. |
| 2005/0143209 A1* | 6/2005 | Shibutani ................. F16G 5/20 474/260 |
| 2010/0167860 A1 | 7/2010 | Mori et al. |
| 2010/0173740 A1 | 7/2010 | Mori et al. |
| 2012/0058849 A1 | 3/2012 | Yoshida |

FOREIGN PATENT DOCUMENTS

| | | |
|---|---|---|
| JP | 2004-116755 | 4/2004 |
| JP | 2004-162894 A | 6/2004 |
| JP | 2004-162897 A | 6/2004 |
| JP | 2004-255619 | 9/2004 |
| JP | 2004-276581 | 10/2004 |
| JP | 4071131 | 1/2008 |
| JP | 2010-053935 | 3/2010 |
| JP | 2011-099457 | 5/2011 |
| JP | 2010-539394 | 12/2012 |
| WO | WO 2010/134289 A1 | 11/2010 |

OTHER PUBLICATIONS

Form PCT/ISA/237 for corresponding International Application No. PCT/JP2012/006194 dated Dec. 11, 2012.

\* cited by examiner

FRICTION DRIVE BELT AND MANUFACTURING METHOD THEREFOR

TECHNICAL FIELD

The present disclosure relates to friction drive belts including a belt body made of a rubber composition, and a manufacturing method of the friction drive belts.

BACKGROUND ART

With respect to friction drive belts such as V-ribbed belts, various techniques have conventionally been proposed to reduce slip noise or other noise that are produced on pulleys during running of the belts.

For example, Patent Document 1 discloses that powder such as talc powder is caused to adhere to the surfaces of V-shaped ribs of a V-ribbed belt after vulcanization-molding of the V-ribbed belt.

Patent Document 2 discloses that short fibers are provided so as to partially protrude from the surfaces of V-shaped ribs of a V-ribbed belt, and powder such as talc powder is caused to adhere to the surfaces of the V-shaped ribs such that the protruding portions of the short fibers are buried under the talc powder.

Patent Document 3 discloses that a V-ribbed belt having short fibers firmly adhering to the surfaces of V-shaped ribs is manufactured by applying an adhesive to the surface of a vulcanization-molded belt sleeve, and spraying the short fibers on the applied adhesive.

Patent Document 4 discloses that a V-ribbed belt having short fibers adhering to the surfaces of V-shaped ribs is manufactured by applying an adhesive to the inner peripheral surface of an outer mold which has a pattern of the V-shaped ribs formed thereon, and spraying the short fibers on the applied adhesive, while setting a non-crosslinked rubber composition and a cord on an inner mold.

However, a V-ribbed belt having powder such as talc powder which has been sprayed and adheres to the surfaces of V-shaped ribs has a disadvantage: The power adhering to the V-shaped rib surfaces falls off in a short time due to contact with pulleys in running of the belt. In particular, when the belt gets wet in the rain for example, water flow considerably easily causes the powder to fall off the V-shaped rib surfaces, thereby eliminating the noise prevention effect of the powder.

In view of this, Patent Document 5 proposes a V-ribbed belt whose pulley contact-side surfaces of ribs are covered with a powder layer which is combined and integrated with the pulley contact-side surfaces.

CITATION LIST

Patent Document

Patent Document 1: Japanese Unexamined Patent Publication No. 2004-116755
Patent Document 2: Japanese Examined Utility Model Publication No. H07-31006
Patent Document 3: Japanese Unexamined Patent Publication No. 2004-276581
Patent Document 4: Japanese Patent No. 4071131
Patent Document 5: International Publication No. 2010/134289

SUMMARY OF THE INVENTION

Technical Problem

According to Patent Document 5, since the powder layer covering the pulley contact-side surfaces of the belt body is combined and integrated with the pulley contact-side surfaces, it is unlikely that water causes the powder to fall off, and accordingly, it is possible to obtain effect of reducing slip nose produced between the belt and pulleys.

On the other hand, in the belt of Patent Document 5, since the rubber is combined and integrated with the powder, portions where the rubber is exposed are likely to cause noise. In addition, the powder is easily caused to peel off by wearing out of the belt, and a toughness life of noise prevention effect (duration of noise prevention effect) of the belt is insufficient. Thus, the belt of Patent Document 5 is susceptible to improvement.

It is therefore an object of the present disclosure to enable a belt to maintain effect of reducing slip noise produced between the belt and pulleys for a long period not only when the belt gets wet with water but also when the belt suffers from wearing out.

Solution to the Problem

To achieve the object, according to the present disclosure, powder is provided on a pulley contact-side surface of a belt body of a friction drive belt, in the following manner: A fabric layer is provided on the pulley contact-side surface, and the powder is caused to become embedded between fibers of the fabric layer to be integrally stuck.

Specifically, a first aspect of the present disclosure relates to a friction drive belt including a belt body made of a rubber composition, and wrapped around pulleys to transmit power. In this friction drive belt, a pulley contact-side surface of the belt body is covered with a fabric layer which is integrated with the pulley contact-side surface, and the fabric layer retains powder embedded between fibers of the fabric layer.

A second aspect of the present disclosure relates to a friction drive belt including a belt body made of a rubber composition, and wrapped around pulleys to transmit power. In this friction drive belt, a pulley contact-side surface of the belt body is covered with a fabric layer which is integrated with the pulley contact-side surface. A surface of the fabric layer is covered with powder, and between fibers of the fabric layer, at least part of the powder is integrated with and stuck to the rubber composition seeping from the belt body.

A third aspect of the present disclosure relates to a friction drive belt including a belt body made of a rubber composition, and wrapped around pulleys to transmit power. This friction drive belt is formed by, in a belt forming mold, pressing a non-crosslinked rubber composition for forming the belt and with fabric wound around a surface of the non-crosslinked rubber composition against a layer of powder provided on a molding surface configured to form a pulley contact-side portion of the belt body and crosslinking the non-crosslinked rubber composition while the fabric wound around the surface is being in contact with the layer of powder and stretched, and thereby causing a fabric layer covering a pulley contact-side surface of the belt body to retain the powder embedded between fibers of the fabric layer.

A fourth aspect of the present disclosure relates to the friction drive belt of any one of the first to third aspects, wherein the fabric layer is made of any one of nonwoven fabric, woven fabric, or knit fabric, and part of the fabric layer is embedded in the belt body.

A fifth aspect of the present disclosure relates to the friction drive belt of any one of the first to fourth aspects, wherein the powder is made of at least one of PTFE, montmorillonite, talc, calcium carbonate, silica, or layer silicate.

A sixth aspect of the present disclosure relates to the friction drive belt of any one of the first to fifth aspects, wherein the belt body includes a pulley contact-side surface rubber layer containing a material that reduces a friction coefficient, and an inner rubber layer stacked on an inner surface of the pulley contact-side surface rubber layer, and the fabric layer is located on a surface of the pulley contact-side surface rubber layer.

A seventh aspect of the present disclosure relates to a method for manufacturing a friction drive belt. The method includes a step of crosslinking, in a belt forming mold, a non-crosslinked rubber composition for forming the belt while pressing the non-crosslinked rubber composition against a molding surface configured to form a pulley contact portion of a belt body, wherein the method further includes a step of forming a layer of powder by spraying the powder onto the molding surface, and in the step of crosslinking, the non-crosslinked rubber composition is crosslinked while fabric wound around a surface of the non-crosslinked rubber composition is being in contact with the layer of powder.

An eighth aspect of the present disclosure relates to the method of the seventh aspect, wherein the powder to be sprayed onto the molding surface of the belt forming mold is electrically charged.

Advantages of the Invention

According to the present disclosure, a pulley contact-side surface of a belt body of a friction drive belt is covered with a fabric layer which is integrated with the pulley contact-side surface, and the fabric layer retains powder embedded between the fibers of the fabric layer and integrally stuck. With this configuration, the fabric layer covers the pulley contact-side surface without allowing the rubber to be exposed, thereby enabling prevention of noise which could be caused by the exposed rubber. In addition, not only wetting with water but also wearing out is unlikely to cause the powder embedded between the fibers of the fabric layer to peel off. Thus, an effect of reducing noise produced between the belt and pulleys can be stably obtained for a long period, and toughness life of noise prevention effect can be prolonged.

DESCRIPTION OF EMBODIMENTS

Embodiments of the present disclosure will be described below in detail with reference to the drawings. The following embodiments are merely preferred examples in nature, and are not intended to limit the scope, applications, and use of the present disclosure.

(Friction Drive Belt)

Figure 1:
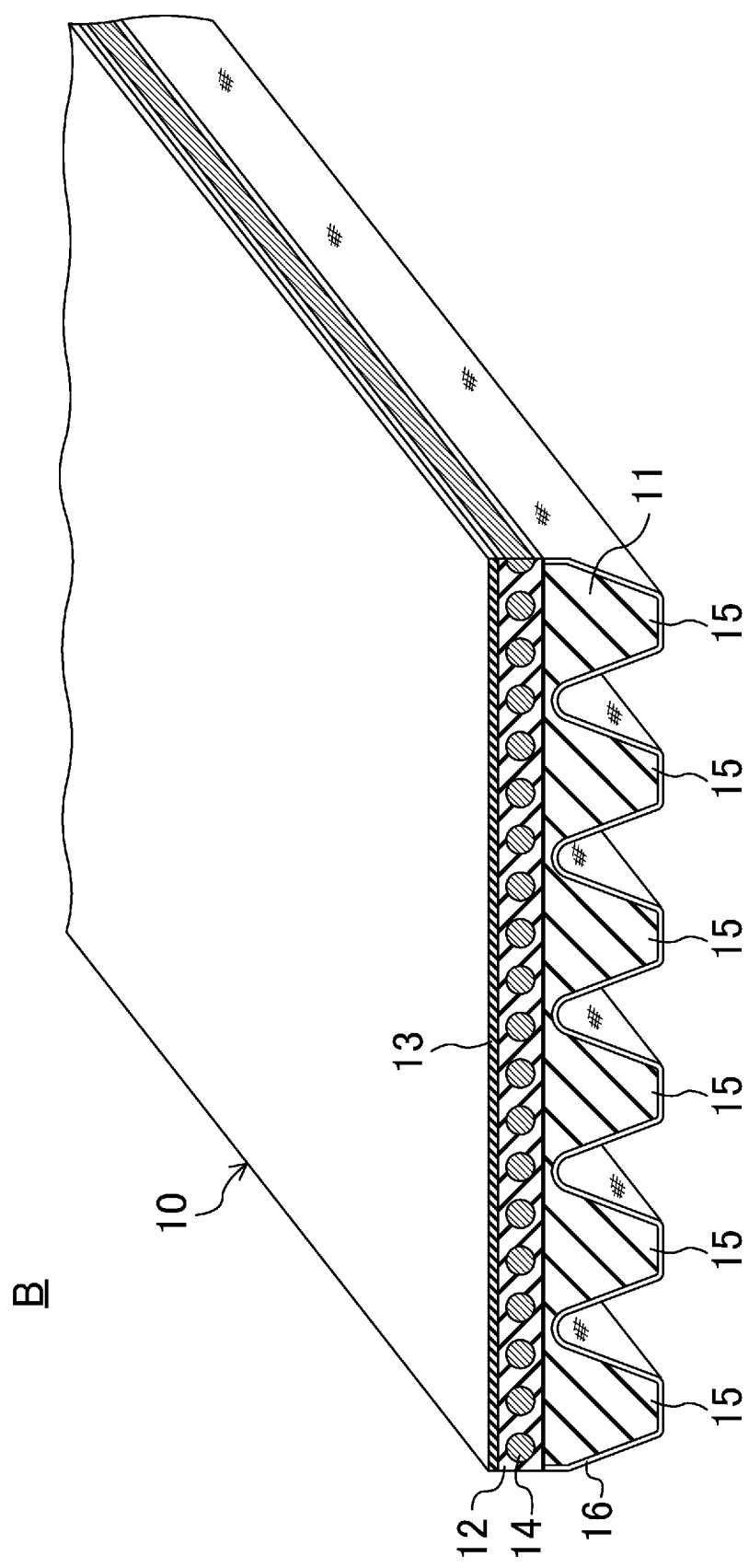
FIG. 1 is a perspective view of a V-ribbed belt according to an embodiment of the present disclosure.
Figure 2:
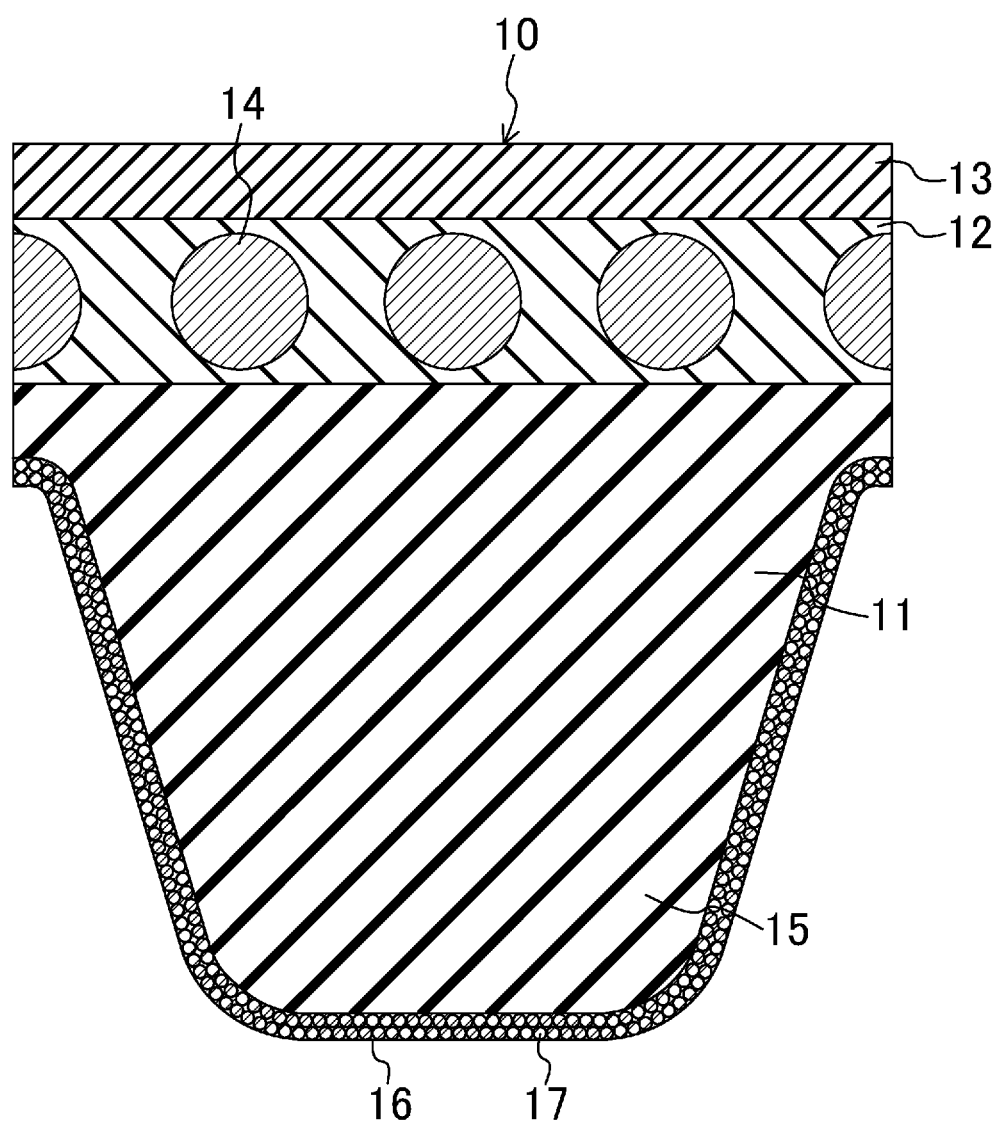
FIG. 2 is an enlarged cross-section view of a main portion of the V-ribbed belt.

FIGS. 1 and 2 illustrate a V-ribbed belt B which is a friction drive belt according to an embodiment of the present disclosure. As will be described later, the V-ribbed belt B is used, e.g., in an accessory drive belt transmission system provided in an engine room of an automobile. For example, the V-ribbed belt B has a belt circumference of 700-3000 mm, a belt width of 10-36 mm, and a belt thickness of 4.0-5.0 mm.

The V-ribbed belt B includes a V-ribbed belt body 10 with a three-layer structure including a compression rubber layer 11 provided near the inner periphery of the belt, an adhesion rubber layer 12 provided as an intermediate layer, and a backing rubber layer 13 (a upper rubber layer) provided near the outer periphery of the belt. A cord 14 is embedded in the adhesion rubber layer 12 so as to form a helical pattern having a pitch in the belt width direction.

The compression rubber layer 11 has a plurality of V-shaped ribs 15 projecting toward the inside of the belt. The plurality of V-shaped ribs 15 each of which is in a shape of a rib extending in the belt length direction and having a cross section substantially shaped in an inverted triangle are arranged parallel to one another in the belt width direction. For example, each V-shaped rib 15 has a rib height of 2.0-3.0 mm, and a width of 1.0-3.6 mm at the base end. The number of the ribs is three to six, for example (six ribs in FIG. 1). The compression rubber layer 11 is made of a rubber composition crosslinked with a crosslinker and produced by heating and pressing a non-crosslinked rubber composition prepared by kneading a rubber component blended with various rubber compounding ingredients.

Examples of the rubber component for the rubber composition forming the compression rubber layer 11 include ethylene-α-olefin elastomers, chloroprene-rubber (CR), chlorosulfonated polyethylene rubber (CSM), and hydrogenated acrylonitrile rubber (H-NBR). The rubber component may be made of either a single substance or a mixture of two or more substances.

Examples of the compounding ingredients include a reinforcing agent such as carbon blacks, a vulcanization accelerator, a crosslinker, an antioxidant, and a softener.

Examples of the carbon blacks to be used as the reinforcing agent include channel black, furnace black such as SAF, ISAF, N-339, HAF, N-351, MAF, FEF, SRF, GPF, ECF, and N-234, thermal black such as FT and MT, and acetylene black. Silica is another example of the reinforcing agent. The reinforcing agent may be made of either a single substance or two or more substances. In order to achieve a satisfactory balance between wear resistance and bending resistance, it is preferable that 30-80 parts by mass of the reinforcing agent is blended relative to 100 parts by mass of the rubber component.

Examples of the vulcanization accelerator include metal oxides such as magnesium oxide and zinc oxide (zinc white), metal carbonates, fatty acids such as stearic acid, and derivatives thereof. The vulcanization accelerator may be made of either a single substance or two or more substances. For example, 0.5-8 parts by mass of the vulcanization accelerator is blended relative to 100 parts by mass of the rubber component.

Examples of the crosslinker include sulfur and organic peroxides. Sulfur, an organic peroxide, or a combination thereof may be used as the crosslinker. It is preferable that 0.5-4.0 parts by mass of sulfur serving as the crosslinker is blended relative to 100 parts by mass of the rubber component. For example, 0.5-8 parts by mass of the organic peroxide serving as the crosslinker is blended relative to 100 parts by mass of the rubber component.

Examples of the antioxidant include amine-based agents, quinoline-based agents, hydroquinone derivatives, phenol-based agents, and phosphite-based agents. The antioxidant may be made of either a single agent or two or more agents. For example, 0-8 parts by mass of the antioxidant is blended relative to 100 parts by mass of the rubber component.

Examples of the softener include petroleum softeners, mineral oil-based softeners such as paraffin wax, and vegetable oil based-softeners such as castor oil, cottonseed oil, linseed oil, rapeseed oil, soybean oil, palm oil, coconut oil, peanut oil, Japan wax, rosin, and pine oil. The softener may be made of either a single substance or two or more substances. Except the petroleum softeners, 2-30 parts by mass of the softener is blended relative to 100 parts by mass of the rubber component, for example.

Layer silicate of the smectite group, of the vermiculite group, or of the kaolin group may be blended as a compounding ingredient.

Figure 3:
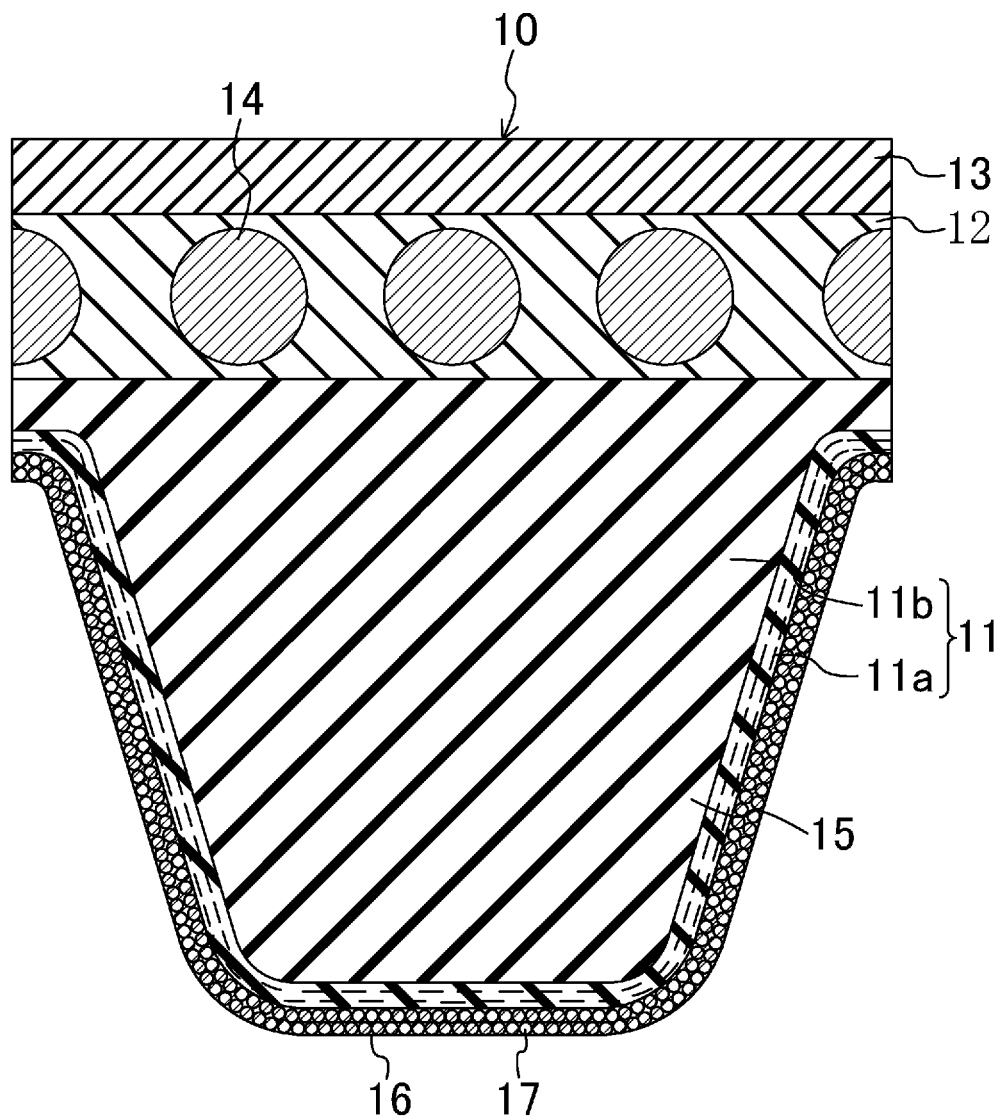
FIG. 3 illustrates, in a manner corresponding to FIG. 2, a V-ribbed belt according to a variation.

The compression rubber layer 11 may be made of either a single rubber composition or a stack of a plurality of rubber compositions. For example, as illustrated in FIG. 3, the compression rubber layer 11 may include a pulley contact-side surface layer 11a containing a material that reduces friction coefficient, and an inner rubber layer 11b stacked on the inner surface of the pulley contact-side surface layer 11a. Examples of the material that reduces friction coefficient include short fibers such as nylon short fibers, vinylon short fibers, aramid short fibers, polyester short fibers, and cotton short fibers, and ultra-high molecular weight polyethylene resins. It is preferable that the inner rubber layer 11b contains no short fibers and no material that reduces friction coefficient.

As illustrated in FIGS. 2 and 3, in the V-ribbed belt body 10, the surfaces of the V-shaped ribs 15 serving as a pulley contact-side surface is covered with a fabric layer 16 which is integrated with the surfaces of the V-shaped ribs 15 (i.e., the pulley contact-side surface). Further, the fabric layer 16 retains powder 17 which is embedded between the fibers of the fabric layer 16 and stuck to and integrated with the rubber.

Figure 13:
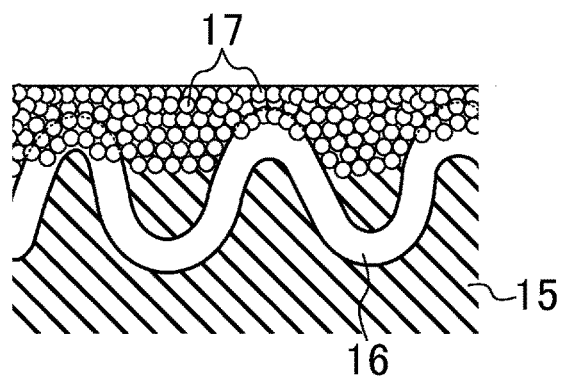
FIG. 13 is a cross-sectional view schematically illustrating the surface of the V-shaped rib (one of side faces facing in the belt width direction) of the molded V-ribbed belt.

More specifically, the surface of the fabric layer 16 is covered with the powder 17, and at least part of the powder 17 that is embedded between the fibers of the fabric layer 16 is stuck to and integrated with the rubber composition seeping from the V-shaped ribs 15 of the V-ribbed belt body 10 (see FIG. 13).

In order to cause the fabric layer 16 to retain the powder 17 embedded between the fibers, it is sufficient to take the following steps, for example. As illustrated in FIGS. 5-10, a powder layer 17' is formed by spraying the powder 17 onto a molding surface which is the inner peripheral surface of an outer mold 32 of a belt forming mold 30 and which is configured to form the V-shaped ribs 15 serving as a pulley contact-side portion of the V-ribbed belt body 10. Next, a non-crosslinked rubber composition (i.e. non-crosslinked rubber sheets 11', 12', and 13') for forming the belt and with fabric 16' for forming the fabric layer 16 wound around the surface is pressed against the powder layer 17' and crosslinked. The crosslinking of the rubber composition is carried out while the fabric 16' is being in contact with the powder layer 17' and stretched. In this manner, the friction drive belt B including the fabric layer 16 that covers the surfaces of the V-shaped ribs 15 (the pulley contact-side surface) of the V-ribbed belt body 10 and has the powder 17 embedded between the fibers is manufactured. This manufacturing method will be detailed later.

The fabric 16' forming the fabric layer 16 is nonwoven fabric, woven fabric, or knit fabric. Examples of the material for the fabric include nylon and polyester. It is preferable that the fabric layer 16 has a thickness of about 0.1-2.0 mm, and specifically, of 0.5-1.0 mm.

Thus, on the compression rubber layer 11, the surfaces of the V-shaped ribs 15 serving as the pulley contact-side surface is covered with the fabric layer 16 which is integrated with the surfaces of the V-shaped ribs 15 and has the powder 17 integrally embedded between the fibers of the fabric layer 16. According to a conventional technique, a V-ribbed belt having powder such as talc powder which has been sprayed after vulcanization-molding of the belt and adheres to the surfaces of V-shaped ribs is disadvantageous in that the power adhering to the V-shaped rib surfaces falls off in a short time due to contact with pulleys in running of the belt. In particular, when the belt gets wet in the rain for example, water considerably easily causes the powder to fall off the V-shaped rib surfaces, thereby eliminating noise prevention effect of the powder. Further, even in case of a conventional V-ribbed belt in which a powder layer covers the surfaces of V-shaped ribs serving as the pulley contact-side surface of a compression rubber layer of a V-ribbed belt body, and the powder forming the powder layer is combined and integrated with the rubber composition of the compression rubber layer by a high temperature and a high pressure of vulcanization-molding, portions where the combined rubber is exposed are likely to produce noise. In addition, friction caused by contact with pulleys easily causes the powder to fall off the belt, thereby reducing a toughness life of noise prevention effect.

In contrast, in the V-ribbed belt body 10 of the V-ribbed belt B of this embodiment, the surfaces of the V-shaped ribs 15 serving as the pulley contact-side surface of the compression rubber layer 11 are covered with the fabric layer 16, which is integrated with the surfaces of the V-shaped ribs 15 and has the powder 17 embedded between the fibers and integrally stuck. More specifically, the surface of fabric layer 16 is covered with the powder 17, and at least part of the powder 17 embedded between the fibers of the fabric layer 16 is stuck to and integrated with the rubber composition seeping from the V-shaped ribs 15 of the V-ribbed belt body 10.

Consequently, on the surfaces of the V-shaped ribs 15, the powder 17 is exposed whereas no portions expose the rubber (the rubber composition). Thus, no noise is produced by the rubber during running of the belt. Since particles of the powder 17 embedded between the fibers of the fabric layer 16 are protected by the fabric layer 16, the powder 17 is unlikely to fall off from the belt. Even if the surfaces are worn out due to contact with pulleys, the particles of the powder 17 embedded deeply between the fibers of the fabric layer 16 become exposed one after another. In this manner, even when used for a long period, the surface of the belt B remains in an almost unchanged state during the long period, and effect of reducing slip nose produced between the belt and the pulleys can be stably exerted for the long period, thereby enabling increase of the toughness life of noise prevention effect.

In addition, since the fabric layer 16 is effective in reducing friction coefficient, it is possible to alleviate wearing out caused by contact with pulleys. Further, the asperities on the surface of the fabric layer 16 can prevent hydroplaning (can drain water) when the belt becomes wet with water, thereby enabling prevention of slipping caused by wetting with water.

The fabric layer 16 having the powder 17 embedded between the fibers may cover the entire surfaces of the V-shaped ribs 15 serving as the pulley contact-side surface. Alternatively, the fabric layer 16 may cover parts of the surfaces of the V-shaped ribs 15 serving as the pulley contact-side surface: for example, parts of the surfaces of the V-shaped ribs 15 corresponding to a half of the circumference of the belt, or the surfaces of the V-shaped ribs 15 located either on the inner half or the outer half with respect to the belt width.

Part of the fabric layer 16 may be embedded in the compression rubber layer 11 of the V-ribbed belt body 10.

Examples of the powder embedded and retained in the fabric layer 16 include PTFE, montmorillonite, talc, calcium carbonate, silica, and layer silicate. The powder may include either a single substance or two or more substances. The particle size of the powder is preferably 0.1-150 µm, and more preferably 0.5-60 µm. Here, the "particle size" refers to a value represented by any of the mesh size of a test sieve as measured by a sieving method, the equivalent Stokes diameter as measured by a sedimentation method, the equivalent spherical diameter as measured by a light scattering method, or the equivalent spherical diameter as measured by an electrical resistance test method.

Examples of the layer silicate include the smectite group, the vermiculite group, and the kaolin group. The smectite group includes, e.g., montmorillonite, beidellite, saponite, and hectorite. The vermiculite group includes, e.g., trioctahedral vermiculite and dioctahedral vermiculite. The kaolin group includes, e.g., kaolinite, dickite, halloysite, lizardite, amesite, and chrysotile. Among these, montmorillonite of the smectite group is preferable as the layer silicate.

The adhesion rubber layer 12 is in a band shape with a horizontally-oriented rectangular cross section, and has a thickness of 1.0-2.5 mm for example. The backing rubber layer 13 is also in a band shape with a horizontally-oriented rectangular cross section, and has a thickness of 0.4-0.8 mm for example. In order to reduce noise that is produced between the belt back face and a flat pulley in contact with the belt back face, the surface of the backing rubber layer 13 preferably has a transferred weave pattern of woven fabric. Each of the adhesion rubber layer 12 and the backing rubber layer 13 is made of a crosslinked rubber composition which is crosslinked with a crosslinker by application of heat and pressure to a non-crosslinked rubber composition produced by kneading a rubber component containing various compounding ingredients. In order to reduce adhesion produced by contact between the belt back face and the flat pulley, the backing rubber layer 13 is preferably made of a rubber composition which is slightly harder than that of the adhesion rubber layer 12. Note that the V-ribbed belt body 10 may be constituted by the compression rubber layer 11 and the adhesion rubber layer 12, and reinforcing fabric such as woven fabric, knit fabric, or nonwoven fabric made of yarns of, e.g., cotton, polyamide fibers, polyester fibers, and aramid fibers, may be provided instead of the backing rubber layer 13.

Examples of the rubber component for the rubber composition forming each of the adhesion rubber layer 12 and the backing rubber layer 13 include ethylene-α-olefin elastomers, chloroprene-rubber (CR), chlorosulfonated polyethylene rubber (CSM), and hydrogenated acrylonitrile rubber (H-NBR). The rubber component of each of the adhesion rubber layer 12 and the backing rubber layer 13 is preferably the same as that of the compression rubber layer 11.

In a manner similar to the compression rubber layer 11, examples of the compounding ingredients include reinforcing agents such as carbon blacks, vulcanization accelerators, crosslinkers, antioxidants, and softeners.

The rubber compositions forming the compression rubber layer 11, the adhesion rubber layer 12, and the backing rubber layer 13 may be either different from each other or the same in constitution.

The cord 14 is made of a twisted yarn of, e.g., polyester fibers (PET), polyethylene naphthalate fibers (PEN), aramid fibers, and vinylon fibers. In order that the cord 14 has adhesion to the V-ribbed belt body 10, the cord 14 is subjected to an adhesion treatment in which the cord is immersed in an RFL aqueous solution and then heated and/or an adhesion treatment in which the cord is immersed in rubber cement and then dried, prior to molding of the V-ribbed belt.

(Accessory Drive Belt Transmission System for Automobile)

Figure 4:
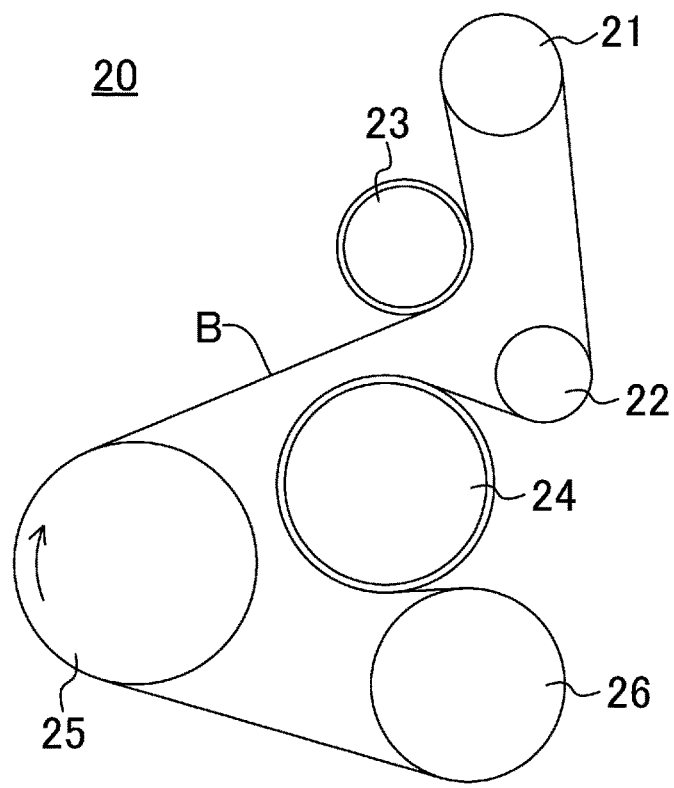
FIG. 4 illustrates a pulley layout of an accessory drive belt transmission system for an automobile.

FIG. 4 illustrates a layout of pulleys of an accessory drive belt transmission system 20 for an automobile using the V-ribbed belt B of this embodiment. This accessory drive belt transmission system 20 is a serpentine drive type system in which the V-ribbed belt B is wrapped around six pulleys including four ribbed pulleys 21, 22, 25, 26 and two flat pulleys 23, 24 to transmit power.

Specifically, the accessory drive belt transmission system 20 includes: the power steering pulley 21 which is disposed uppermost; the AC generator pulley 22 which is disposed below the power steering pulley 21; the tensioner pulley 23 which is one of the flat pulleys and is disposed downwardly leftward of the power steering pulley 21; the water-pump pulley 24 which is the other one of the flat pulleys and is disposed below the tensioner pulley 23; the crankshaft pulley 25 which is disposed downwardly leftward of the tensioner pulley 23; and the air-conditioner pulley 26 which is disposed downwardly rightward of the crankshaft pulley 25. The tensioner pulley 23 and the water-pump pulley 24 are the flat pulleys and the other pulleys are the ribbed pulleys. These ribbed pulleys 21, 22, 25, 26 and the flat pulleys 23, 24 are made of, e.g., a pressed metal product, a casting product, or a resin molding product made of a nylon resin or a phenolic resin, and their pulley diameters are 50-150 mm.

In the accessory drive belt transmission system 20, the V-ribbed belt B is sequentially wrapped around the pulleys in the following manner: the power steering pulley 21 with the surface having the V-shaped ribs 15 in contact with the power steering pulley 21; the tensioner pulley 23 with the belt back face in contact with the tensioner pulley 23; the crankshaft pulley 25 and then the air-conditioner pulley 26 with the surface having the V-shaped ribs 15 in contact with the pulleys 25 and 26; the water-pump pulley 24 with the belt back face in contact with the water-pump pulley 24; the AC generator pulley 22 with the surface having the V-shaped ribs 15 in contact with the AC generator pulley 22; and then the power steering pulley 21 again. Belt span lengths which are the lengths of the parts of the V-ribbed belt B between adjacent ones of the pulleys 21-26 are 50-300 mm, for example. Misalignment produced between the pulleys 21-26 is 0-2°.

As described above, the fabric layer 16 covers the surfaces of the V-shaped ribs 15 that serve as the pulley contact-side surface of the compression rubber layer 11 of the V-ribbed belt body 10 of the V-ribbed belt B, and is integrated with the surfaces of the V-shaped ribs 15. The powder 17 embedded between the fibers of the fabric layer 16 is stuck in an integral manner. Accordingly, it is possible to maintain, for a long period, the effect of reducing slip noise produced between the ribbed pulleys such as the power steering pulley 21 and the V-ribbed belt.

(Manufacturing Method of Friction Drive Belt)

A manufacturing method of the V-ribbed belt B will be described below as an example, with reference to FIGS. 5-10.

Figure 5:
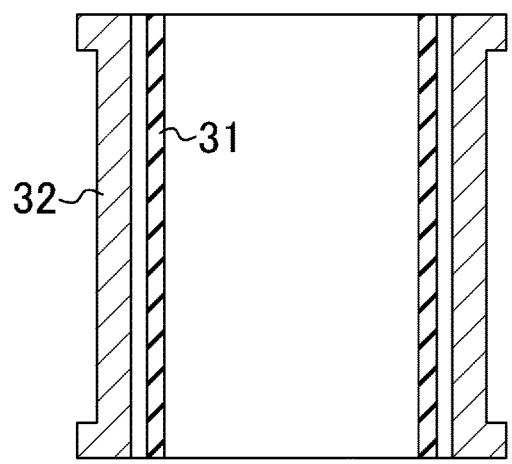
FIG. 5 is a longitudinal cross-sectional view of a belt forming mold.
Figure 6:
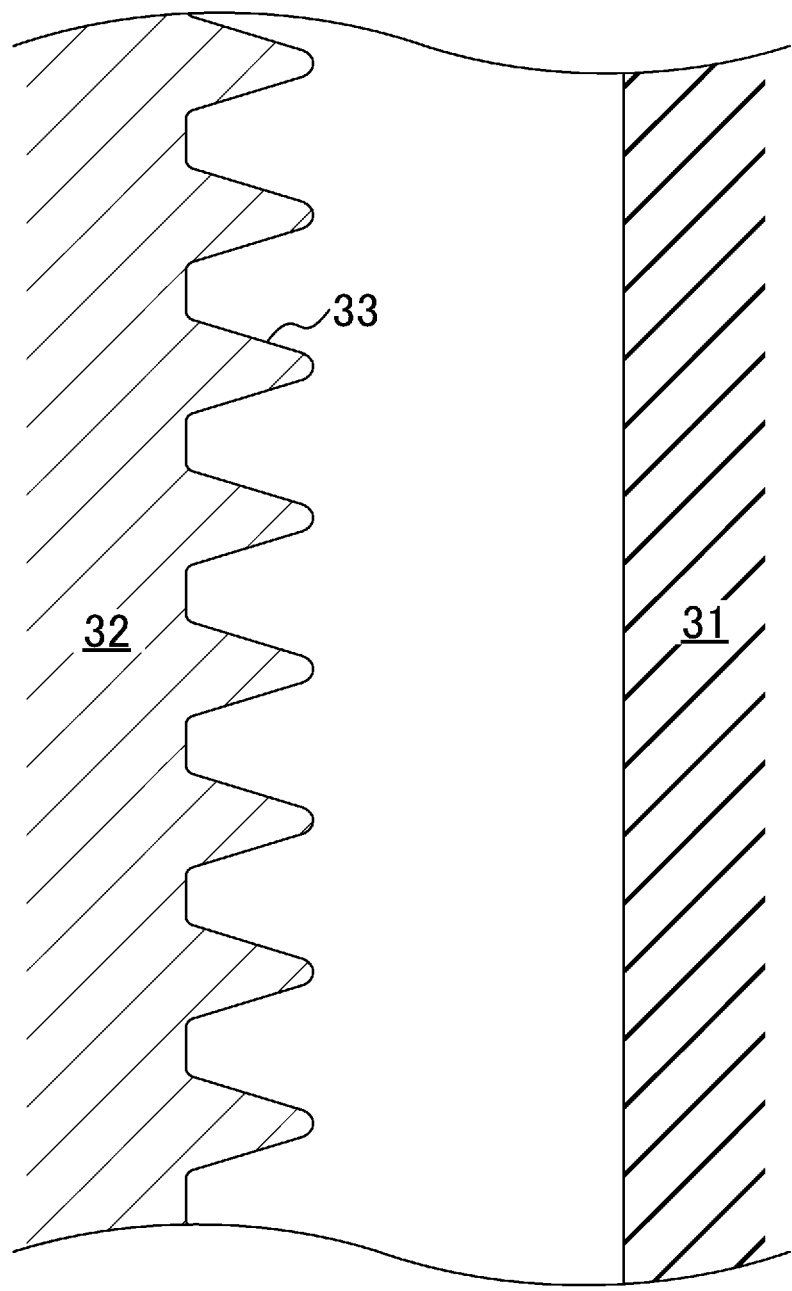
FIG. 6 is an enlarged longitudinal cross-sectional view of a portion of the belt forming mold.

The belt forming mold 30 is used to manufacture the V-ribbed belt B of this embodiment. As illustrated in FIGS. 5 and 6, the belt forming mold 30 includes a cylindrical inner mold 31 (which is a sleeve made of, e.g., rubber) and the outer mold 32, which are provided concentrically relative to each other.

The inner mold 31 is made of a flexible material such as rubber. The outer peripheral surface of the inner mold 31 serves as a molding surface configured to mold the outer peripheral surface of the belt B. The outer peripheral surface of the inner mold 31 has a weave pattern of woven fabric, for example.

On the other hand, the outer mold 32 is made of a rigid material such as a metal. The inner peripheral surface of the outer mold 32 serves as a molding surface configured to mold the inner peripheral surface of the belt B. As illustrated in FIG. 6, the inner periphery surface of the outer mold 32 has V-shaped rib forming grooves 33 configured to form the V-shaped ribs 15 of the belt B. The grooves 33 extend in the axial direction and are arranged at regular intervals.

The outer mold 32 is provided with a temperature control mechanism (not shown) which controls a temperature by causing a heating medium such as water vapor or a cooling medium such as water to flow. This belt forming mold 30 is provided with a pressurizing means (not shown) configured to pressurize and expand the inner mold 31 from the inside toward the outside in a radial direction with the use of high-pressure air, for example.

In the manufacturing method of the V-ribbed belt B, first, the compounding ingredients are blended into the rubber component, and the resultant blend is kneaded with a kneading machine such as a kneader and a Banbury mixer. The resultant non-crosslinked rubber composition is formed into a sheet shape by calender molding and the like, thereby producing the non-crosslinked rubber sheet 11' (the non-crosslinked composition for forming the belt) for the compression rubber layer 11. The non-crosslinked rubber sheets 12' and 13' for the adhesion rubber layer 12 and the backing rubber layer 13 are also produced in a similar manner. Twisted yarn 14' to serve as the cord 14 is subjected to the adhesion treatment in which the yarn 14' is immersed in an RFL aqueous solution and then heated, and thereafter, to the adhesion treatment in which the yarn 14' is immersed in rubber cement and then dried by heating.

Figure 7:
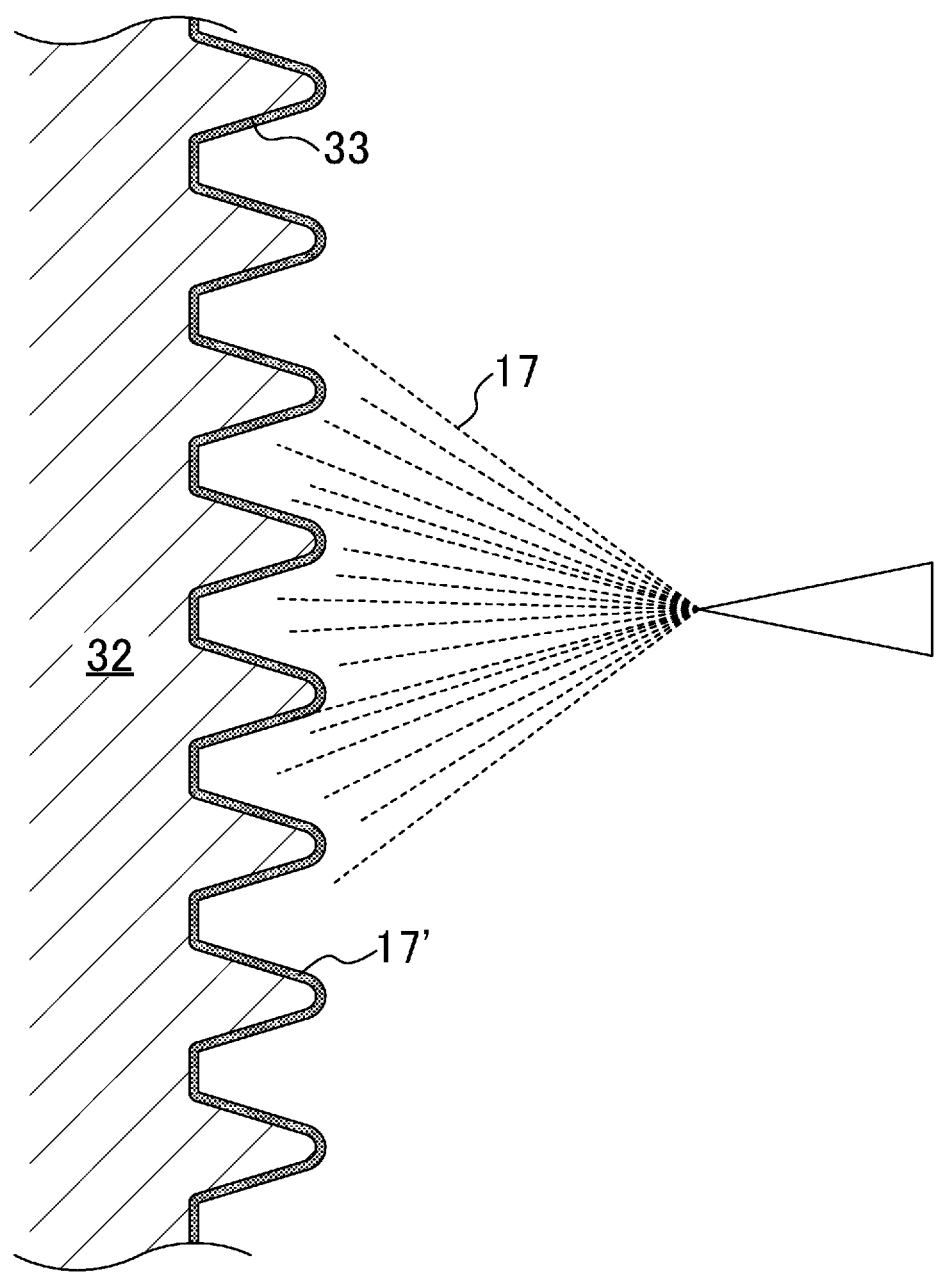
FIG. 7 illustrates a step of spraying powder onto a molding surface of an outer mold.

Next, as illustrated in FIG. 7, the powder 17 is sprayed onto the inner peripheral surface of the outer mold 32 serving as the molding surface configured to form the pulley contact-side portion, thereby forming the powder layer 17'. The thickness of the powder layer 17' is preferably 0.1-200 μm, and more preferably 1.0-100 μm. At this time, in order to increase adhesion to the outer mold 32, the powder to be sprayed is preferably electrically charged by application of a voltage of, e.g., 10-100 kV. The powder 17 can be sprayed by using a generally-used powder coating device.

Figure 8:
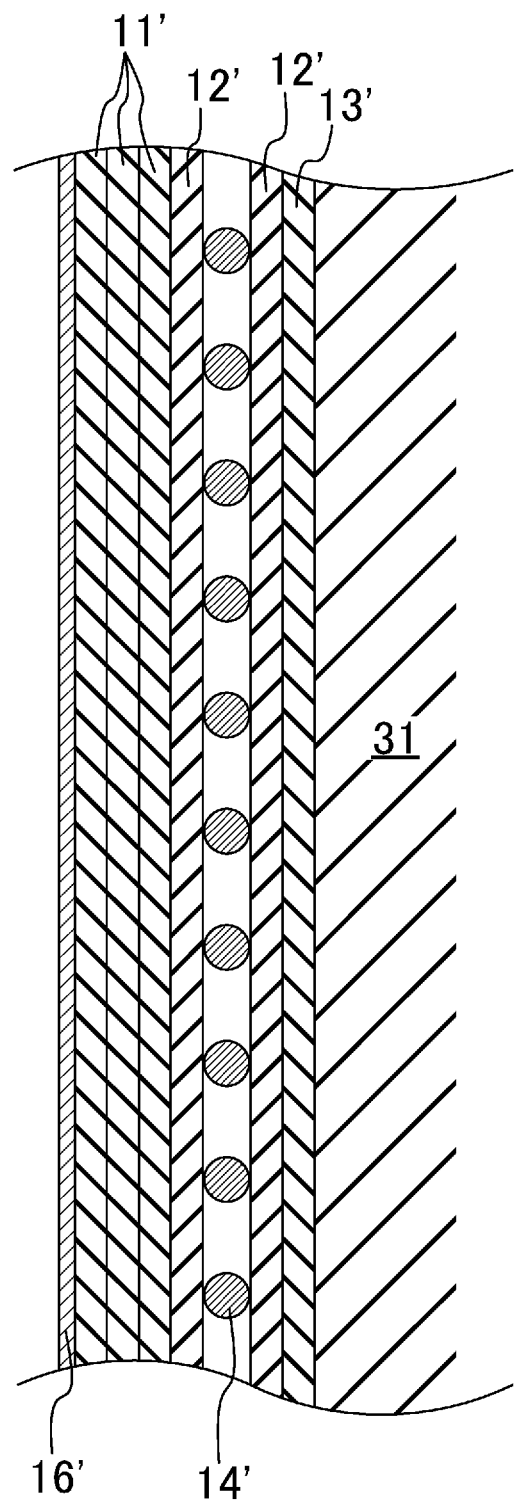
FIG. 8 illustrates a step of setting non-crosslinked rubber sheets, a twisted yarn, and fabric in an inner mold.

On the other hand, as illustrated in FIG. 8, the non-crosslinked rubber sheet 13' for the backing rubber layer 13 and the non-crosslinked rubber sheet 12' for the adhesion rubber layer 12 are sequentially wound around the outer peripheral surface of the inner mold 31 serving as the molding surface so as to be stacked thereon. Thereafter, the twisted yarn 14' for the cord 14 is helically wound around the stacked rubber sheets on the cylindrical inner mold 31. Further, another non-crosslinked rubber sheet 12' for the adhesion rubber layer 12 and the non-crosslinked rubber sheet 11' for the compression rubber layer 11 are sequentially wound therearound so as to be stacked thereon. Furthermore, fabric 16' forming the fabric layer 16 is wound around the non-crosslinked rubber sheet 11' for the compression rubber layer 11 so as to be stacked thereon.

Note that in the case of manufacturing the V-ribbed belt B having the configuration illustrated in FIG. 3, the pulley contact-side surface layer 11a and the inner rubber layer 11b that are made of different rubber compositions may be used as the non-crosslinked rubber sheet 11' for the compression rubber layer 11.

Figure 9:
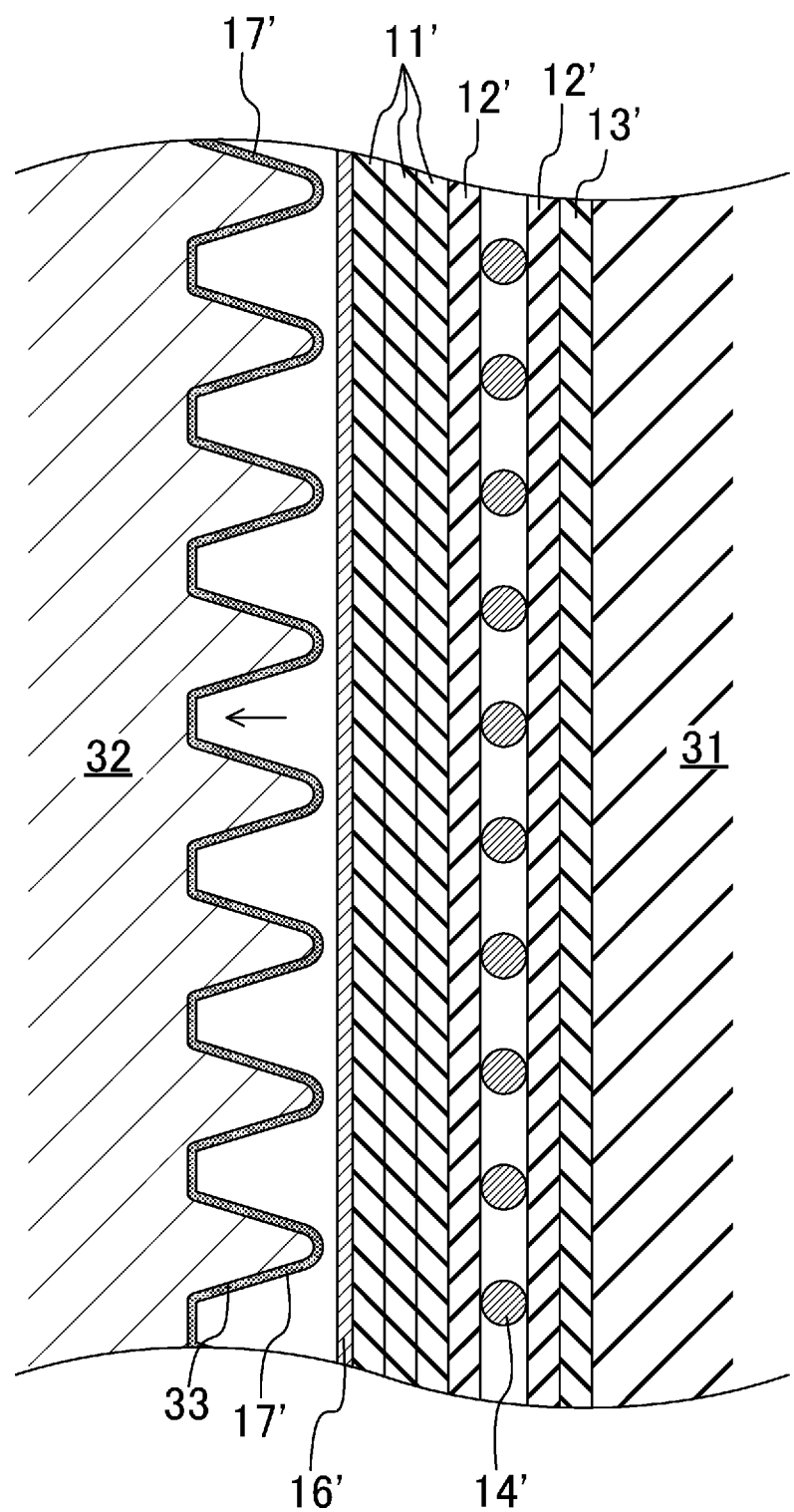
FIG. 9 illustrates a step of positioning the inner mold in the outer mold.

Next, as illustrated in FIG. 9, the inner mold 31 is positioned in the outer mold 32, and is sealed. At this time, the space inside the inner mold 31 enters a hermetically sealed state.

Figure 10:
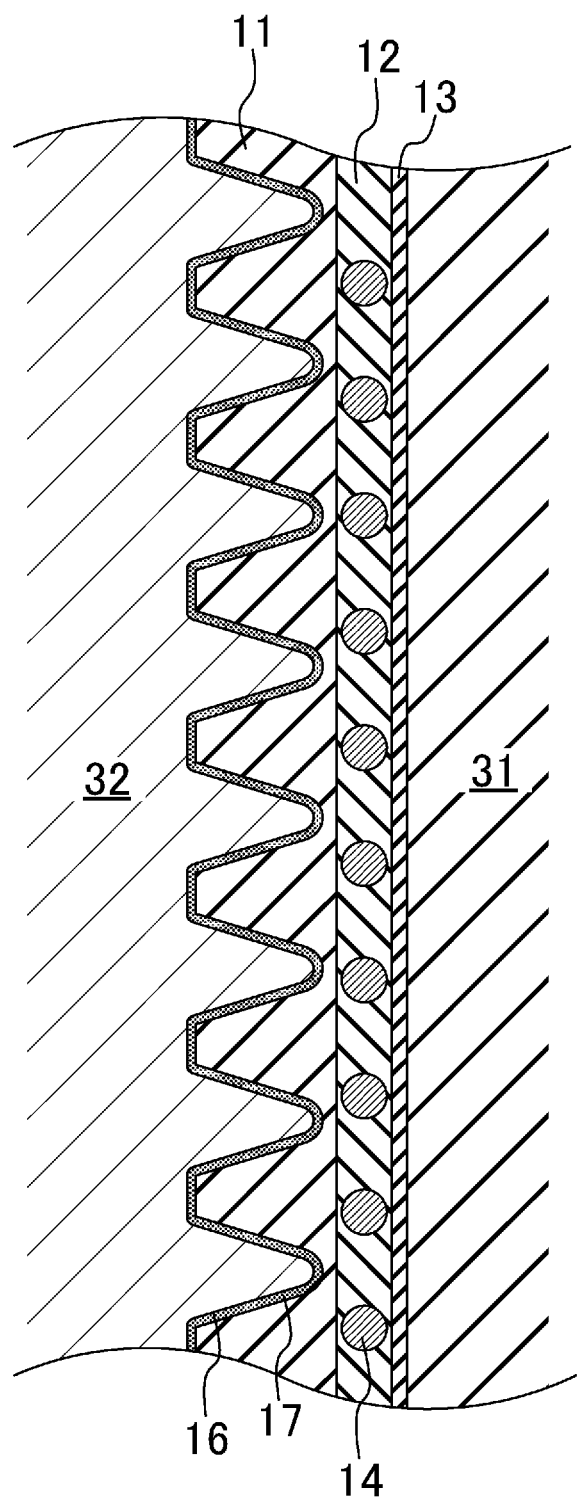
FIG. 10 illustrates a step of molding a belt slab.

Subsequently, the outer mold 32 is heated, and the pressurizing means injects, e.g., high-pressure air into the hermetically sealed space inside the inner mold 31 to carry out pressurization. With this pressurization, as illustrated in FIG. 10, the inner mold 31 is expanded outward in a radial direction, thereby pressing the non-crosslinked rubber sheets 11', 12', and 13' against the molding surface of the outer mold 32 with the fabric 16' being in contact with the molding surface. Consequently, the plurality of V-shaped ribs 15 are formed by the V-shaped rib forming grooves 33 on the molding surface of the outer mold 32. Moreover, crosslinking of the non-crosslinked rubber sheets 11', 12', and 13' progresses, and the non-crosslinked rubber sheets 11', 12', and 13' are integrated with the fabric 16' and combined with the twisted yarns 14'. As a result, a cylindrical belt slab with the outer peripheral surface integrated with the fabric layer 16 is molded.

The powder layer 17' having been formed in advance by spraying the powder onto the molding surface of the outer mold 32 becomes embedded between the fibers of the fabric layer 16 covering and being integral with the outer peripheral surface of the belt slab to be also integrated. The powder 17 of the powder layer 17' embedded between the fibers of the fabric layer 16 is stuck by the crosslinked rubber. For example, this belt slab is molded at a temperature of 100-180° C. and at pressure of 0.5-2.0 MPa, and a molding time of the belt slab is 10-60 minutes.

In the molding of the belt slab, it might be possible to form the powder layer 17' in the following manners, instead of the above method in which the powder 17 is sprayed in advance onto the molding surface of the outer mold 32. Specifically, the powder layer 17' might be formed by spraying or applying the powder 17 onto the surface of the fabric 16' having been wound around and stacked on the non-crosslinked rubber sheet 11' for the compression rubber layer 11. Thereafter, in the same manner as the above method, the non-crosslinked rubber sheets 11', 12', and 13' might be pressed against the molding surface of the outer mold 32 having no powder layer. Alternatively, the powder layer 17' might be formed in advance by spraying or applying the powder 17 onto the surface of the fabric 16', and the fabric 16' having the powder layer 17' formed thereon might be wound around and stacked on the non-crosslinked rubber sheet 11' for the compression rubber layer 11. Thereafter, in the same manner as the above method, the non-crosslinked rubber sheets 11', 12', and 13' might be pressed against the molding surface of the outer mold 32 having no powder layer.

Figure 14:
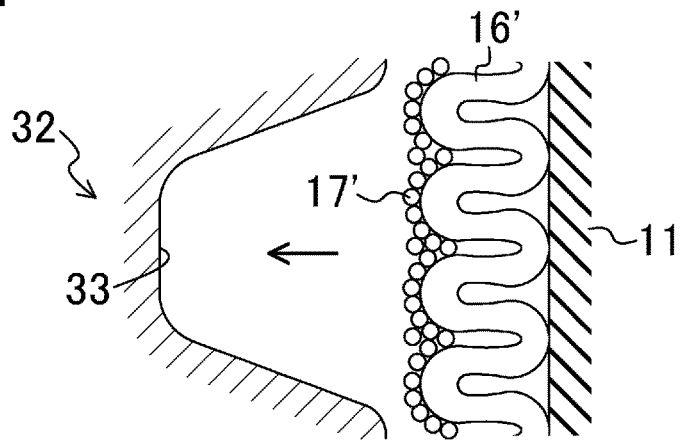
FIG. 14 illustrates, in a manner corresponding to FIG. 11, a case in which a powder layer is formed on fabric.
Figure 15:
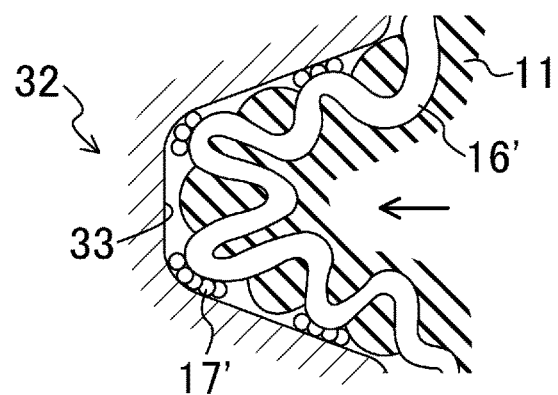
FIG. 15 illustrates, in a manner corresponding to FIG. 12, the case in which the powder layer is formed on the fabric.
Figure 16:
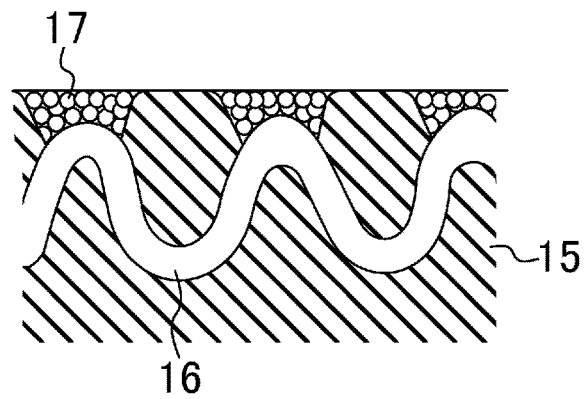
FIG. 16 illustrates, in a manner corresponding to FIG. 13, the case in which the powder layer is formed on the fabric.

However, according to both of these two manners in which the powder layer 17' is formed on the surface of the fabric 16' as illustrated in FIG. 14, in the molding of the belt slab, the fabric 16' on the non-crosslinked rubber sheet 11' is largely stretched along the V-shaped rib forming grooves 33 on the molding surface of the outer mold 32. This stretching of the fabric 16' on the non-crosslinked rubber sheet 11' causes the powder layer 17' formed on the fabric 16' to be largely stretched and deformed together with the fabric 16', as illustrated in FIG. 15. Accordingly, even if the powder 17 is caused to adhere to the surface of the fabric 16' without leaving any gap, a deformation in the surface of the fabric 16' produces gaps in the powder layer 17'. The rubber (the rubber composition) of the non-crosslinked rubber sheet 11' seeps through the gaps from the back surface of the fabric 16' and becomes exposed while wetting the surface of the fabric 16'. Consequently, as illustrated in FIG. 16, in the manufactured V-ribbed belt B, rubber is exposed in some portions or most of the surfaces of the V-shaped ribs 15 that serve as the pulley contact-side surface of the V-ribbed belt body 10. In addition, the powder 17 is not embedded between the fibers of the fabric layer 16, but adheres to some portions of the surfaces of the V-shaped ribs 15, resulting in that the surfaces of the V-shaped ribs 15 cannot be covered with the exposed powder 17. Thus, the rubber exposed on the surfaces of the V-shaped ribs 15 increases friction coefficient to produce slip noise between pulleys and the belt, and the powder 17 on the surfaces of the V-shaped ribs 15 easily falls off because of the friction and thereby produces the similar slip noise.

Figure 11:
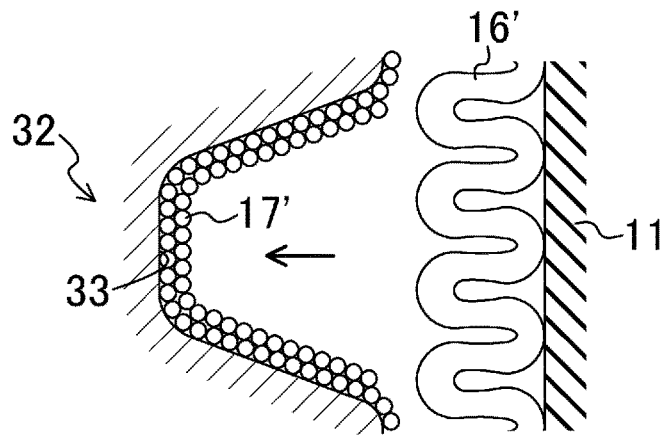
FIG. 11 is a cross-sectional view schematically illustrating a state in which the non-crosslinked rubber sheet for forming the belt is going to be pressed against a V-shaped rib forming groove of the outer mold, in a method for manufacturing the V-ribbed belt of the embodiment of the present disclosure.
Figure 12:
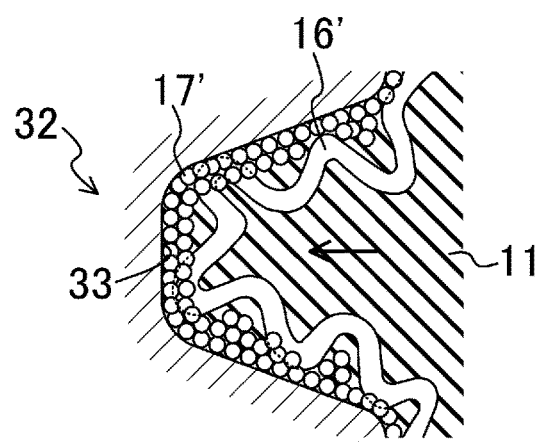
FIG. 12 is a cross-sectional view schematically illustrating a state in which the non-crosslinked rubber sheet for forming the belt is being pressed against the V-shaped rib forming groove of the outer mold.

Unlike the above manners in which the powder layer 17' is formed directly on the surface of the fabric 16', the powder layer 17' of this embodiment is formed by spraying the powder 17 onto the inner peripheral surface of the outer mold 32 serving as the molding surface configured to form the pulley contact-side portion, as illustrated in FIG. 11. Accordingly, as illustrated in FIG. 12, only the fabric 16' wound around the non-crosslinked rubber sheet 11' on the outer peripheral surface of the inner mold 31 is largely stretched along the V-shaped rib forming groves 33 on the molding surface of the outer mold 32, and the stretched fabric 16' is pressed to be in contact with the powder layer 17' on the molding surface. Consequently, the powder 17 on the molding surface of the outer mold 32 becomes smoothly embedded between the fibers of the stretched fabric 16'. Thus, unlike the above two manners, the powder layer 17' is not moved or deformed on the fabric 16' along with the stretching of the fabric 16'. As a result, in the manufacture V-ribbed belt B, the surfaces of the V-shaped ribs 15 (the side surfaces of the V-shaped ribs 15 facing in the belt width direction) serving as the pulley contact-side surface of the V-ribbed belt body 10 are almost entirely or entirely covered with the exposed powder 17, as illustrated in FIG. 13.

In addition, when the fabric 16' is in the stretched and deformed state, the weave of the fabric 16' is caused to open, and the fabric 16' with the open weave comes into contact with the powder layer 17'. Consequently, the powder 17 becomes more smoothly embedded between the fibers of the fabric layer 16, resulting in that the powder is unlikely to fall off because of the friction between the belt and pulleys. The powder 17 that has become embedded between the fibers of the fabric layer 16 from the surface of the fabric layer 16 prevents the rubber (the rubber composition) of the non-crosslinked rubber sheet 11' that has soaked into the fabric layer 16 from the back surface of the fabric layer 16 from seeping to the surface of the fabric layer 16, thereby allowing no rubber to be exposed on the surfaces of the V-shaped ribs 15. Moreover, in the fabric layer 16, the rubber that is going to seep to the surfaces and the powder 17 are integrated with each other, and the stuck powder 17 is unlikely to fall off. In synergy with these effects, the friction coefficient of the surfaces of the V-shaped ribs 15 can be maintained low for a long period, and the effect of reducing slip noise produced between the belt and pulleys can be ensured for a long time. Note that, for the sake of explanation, the particle size of the powder 17 and the sizes of the fibers of the fabric layer 16 and the fabric 16' illustrated in FIGS. 11-16 are reduced or enlarged.

That is, the state in which the fabric layer 16 retains the powder 17 embedded between the fibers (i.e., the state in which the surface of the fabric layer 16 is covered with the powder 17, and at least part of the powder 17 is, between the fibers of the fabric layer 16, integrated with and stuck to the rubber composition seeping from the V-shaped ribs 15 of the V-ribbed belt body 10) can be surely and effectively achieved only by the manufacturing method in which the non-crosslinked rubber composition for forming the belt having the fabric 16' wound around the surface of the non-crosslinked rubber composition is pressed onto the powder layer 17' formed on the molding surface of the outer mold 32, and the rubber composition is crosslinked while stretching, along the V-shaped rib forming grooves 33 on the molding surface, the fabric 16' being in contact with the powder layer 17'.

Then, the space inside the inner mold 31 is reduced in pressure to be released from the hermetically sealed state, and the belt slab formed between the inner mold 31 and the outer mold 32 is removed. The belt slab is cut into rings having a predetermined width, and each ring is turned inside out, thereby obtaining the V-ribbed belt B.

(Other Embodiments)

Although the V-ribbed belt B is described as a friction drive belt in this embodiment, the present disclosure is not particularly limited to this. As a matter of course, the present disclosure is also applicable to friction drive belts of other types, such as raw edge V-belts.

Although the accessory drive belt transmission system 20 of an automobile is described as the belt transmission system in this embodiment, the present disclosure is not particularly limited to this. The present disclosure is also applicable to general industrial belt transmission systems, for example.

INDUSTRIAL APPLICABILITY

The present disclosure is highly useful for friction drive belts of which a belt body made of a rubber composition is wrapped around pulleys to transmit power and for manufacturing methods of the friction drive belts. The present disclosure has wide industrial applicability.

DESCRIPTION OF REFERENCE CHARACTERS

B V-ribbed belt (Friction drive belt)
10 V-ribbed belt body
11 Compression rubber layer
11' Non-crosslinked rubber sheet
11a Pulley contact-side surface layer
11b Inner rubber layer
12 Adhesion rubber layer
12' Non-crosslinked rubber sheet
13 Backing rubber layer
13' Non-crosslinked rubber sheet
14 Cord
14' Twisted yarn
15 V-shaped rib (Pulley contact-side portion)
16 Fabric layer
16' Fabric
17 Powder
17' Powder layer
20 Accessory drive belt transmission system
30 Belt forming mold
31 Inner mold
32 Outer mold
33 V-shaped rib shaping groove

The invention claimed is:

1. A friction drive belt comprising a belt body made of a rubber composition, and wrapped around pulleys to transmit power, wherein
   a pulley contact-side surface of the belt body is covered with a fabric layer which is integrated with the pulley contact-side surface by way of the rubber composition of the belt body having soaked partially into the fabric layer, and
   the fabric layer retains powder embedded between fibers of the fabric layer without an additional rubber composition or adhesive.

2. The friction drive belt of claim 1, wherein
   the fabric layer is made of any one of nonwoven fabric, woven fabric, or knit fabric, and
   part of the fabric layer is embedded in the belt body.

3. The friction drive belt of claim 1, wherein
   the powder is made of at least one of PTFE, montmorillonite, talc, calcium carbonate, silica, or layer silicate.

4. The friction drive belt of claim 1, wherein
   the rubber composition of the belt body having soaked partially into the fabric layer forms a pulley contact-side surface rubber layer containing a material that reduces a friction coefficient, the fabric layer being located on a surface of the pulley contact-side surface rubber layer, and
   the belt body further includes an inner rubber layer stacked on an inner surface of the pulley contact-side surface rubber layer.

5. The friction drive belt of claim 2, wherein
   the powder is made of at least one of PTFE, montmorillonite, talc, calcium carbonate, silica, or layer silicate.

6. The friction drive belt of claim 2, wherein
   the rubber composition of the belt body having soaked partially into the fabric layer forms a pulley contact-side surface rubber layer containing a material that reduces a friction coefficient, the fabric layer being located on a surface of the pulley contact-side surface rubber layer, and
   the belt body further includes an inner rubber layer stacked on an inner surface of the pulley contact-side surface rubber layer.

7. The friction drive belt of claim 3, wherein
   the rubber composition of the belt body having soaked partially into the fabric layer forms a pulley contact-side surface rubber layer containing a material that reduces a friction coefficient, the fabric layer being located on a surface of the pulley contact-side surface rubber layer, and
   the belt body further includes an inner rubber layer stacked on an inner surface of the pulley contact-side surface rubber layer.

8. A friction drive belt comprising a belt body made of a rubber composition, and wrapped around pulleys to transmit power, wherein
   a pulley contact-side surface of the belt body is covered with a fabric layer which is integrated with the pulley contact-side surface by way of the rubber composition of the belt body having soaked partially into the fabric layer,
   a surface of the fabric layer is covered with powder, and embedded between fibers of the fabric layer without an additional rubber composition or adhesive, at least part of the powder is integrated with and stuck to the rubber composition seeped from the belt body.

9. The friction drive belt of claim 8, wherein
   the fabric layer is made of any one of nonwoven fabric, woven fabric, or knit fabric, and
   part of the fabric layer is embedded in the belt body.

10. The friction drive belt of claim 8, wherein
    the powder is made of at least one of PTFE, montmorillonite, talc, calcium carbonate, silica, or layer silicate.

11. The friction drive belt of claim 8, wherein
    the rubber composition of the belt body having soaked partially into the fabric layer forms a pulley contact-side surface rubber layer containing a material that reduces a friction coefficient, the fabric layer being located on a surface of the pulley contact-side surface rubber layer, and
    the belt body further includes an inner rubber layer stacked on an inner surface of the pulley contact-side surface rubber layer.

12. A friction drive belt comprising a belt body made of a rubber composition, and wrapped around pulleys to transmit power, the friction drive belt formed by in a belt forming mold, pressing a non-crosslinked rubber composition for forming the belt and a fabric layer covering a surface of the non-crosslinked rubber composition against a layer of powder provided on a molding surface configured to form a pulley contact-side portion of the belt body and crosslinking the non-crosslinked rubber composition which the fabric layer covering the surface is being in contact with the layer of powder and stretched, and thereby causing a fabric layer covering a pulley contact-side surface of the belt body to retain the powder embedded between fibers of the fabric layer without an additional rubber composition or adhesive.

13. The friction drive belt of claim 12, wherein the fabric layer is made of any one of nonwoven fabric, woven fabric, or knit fabric, and part of the fabric layer is embedded in the belt body.

14. The friction drive belt of claim 12, wherein the powder is made of at least one of PTFE, montmorillonite, talc, calcium carbonate, silica, or layer silicate.

15. The friction drive belt of claim 12, wherein the rubber composition of the belt body having soaked partially into the fabric layer forms a pulley contact-side surface rubber layer containing a material that reduces a friction coefficient, the fabric layer being located on a surface of the pulley contact-side surface rubber layer, and the belt body further includes an inner rubber layer stacked on an inner surface of the pulley contact-side surface rubber layer.

\* \* \* \* \*